March 23, 1954 H. M. SCOTT 2,673,330

AMPLITUDE MODULATED PULSE TRANSLATING CIRCUITS

Filed Dec. 23, 1952

INVENTOR.
HOWARD M. SCOTT

BY Charles H. Brown
ATTORNEY

Patented Mar. 23, 1954 2,673,330

UNITED STATES PATENT OFFICE 2,673,330

AMPLITUDE MODULATED PULSE TRANSLATING CIRCUITS

Howard Mulder Scott, Philadelphia, Pa., assignor to Radio Corporation of America, a corporation of Delaware Application December 23, 1952, Serial No. 327,485

10 Claims. (Cl. 332—9)

Figures 1, 2, 3:
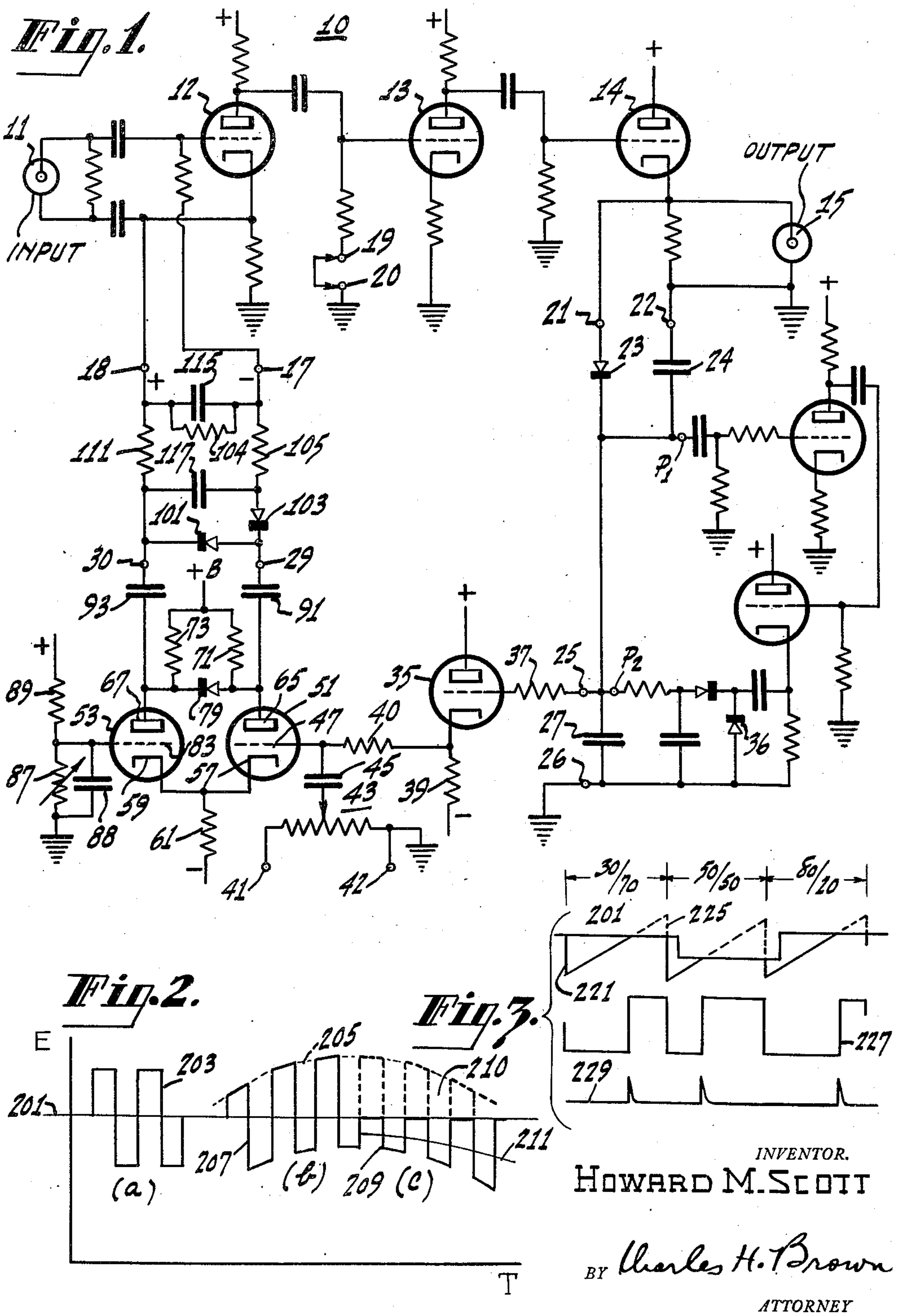

The invention relates to pulse translating circuits. It relates particularly to circuits for translating pulses of differing amplitudes without altering the relative amplitudes of those pulses conveying intelligence by reason of the amplitude variations thereof.

Circuit arrangements are known in which a variety of pulse type signals are passed through amplifiers and mixers to finally terminate at a utilization device at which the peak value of any signals must be limited to a certain value while all other smaller signals must have the relative values maintained as far as amplitude is concerned.

An example of such signals is found in time-division, pulse-amplitude, multiplex communication systems. These signals, though widely variable in content, all have synchronizing pulses that occur at a constant repetition rate with other message bearing pulses between them varying over wide ranges but of lesser amplitude. Another example is found in equipment similar in some respects to known radar apparatus and in which there are maximum peak value pulses occurring at some constant rate and lesser amplitude pulses occurring therebetween at varying times, and with lesser and varying amplitude values for display on some form of indicator such as a kinescope.

If the peak amplitude of signals at the kinescope grid is to have a maximum value, then it would be advantageous to provide the amplifier that applies the pulses to the kinescope with a good automatic gain control (A. G. C.) characteristic under all signal conditions.

The repetition rates of such peak pulse signals as commonly encountered in practice varies between 60 C. P. S. to 15.75 kc. P. S. and the width of these pulses varies betwen .6 $\mu$s. to 10 $\mu$s. Thus there is a need for signal translating circuit having an output peak value which will remain constant for these conditions in response to an input peak value varying as much as 5 to 1.

There are many practical applications for this type of controlled amplifier. In some cases the gain of such an amplifier must be 10,000 or more; in other cases unity gain is sufficient. Also, in some cases the input of the amplifier must be grounded, and in some cases the input must be above ground with the A. G. C. voltage applied to the grid of the first tube.

There is a need for an A. G. C. circuit which can be used within all such pulse translator circuits, and because of the low gain encountered in some of these amplifiers, the A. G. C. circuit must have some amplification. Also, it must be able to work into an amplifier grid resistor, which is grounded or one that is ungrounded.

An object of the invention is to provide, in conjunction with other circuits, automatic gain control for pulse translating systems wherein the pulse repetition is variable over a wide range of values.

Another object of the invention is to provide, in conjunction with other circuits, automatic gain control for pulse handling systems wherein the amplitude of certain peak pulses is limited to a predetermined value while the amplitudes of other pulses are held only to the relative values.

A more specific object is to provide a novel circuit with which to modulate the amplitude of square waves or pulses.

Another specific object is to provide a novel circuit with which to operate with additional circuits to produce D. C. amplification and low frequency amplification.

A further specific object is to provide a novel amplitude comparator circuit.

The objects of the invention are attained by means of a circuit arrangement comprising a pair of controlled electron flow path or electron discharge devices having a cathode impedance in common, individual output impedance elements connected in the anodes and a rectifier element connected between the anodes. A predetermined fixed potential is applied to the control electrode of one of the electron discharge devices, and an alternating potential wave of substantially constant frequency is applied to the control electrode of the other electron discharge device. This wave may be a sine wave, a sawtooth wave or almost any waveform, but a square wave is preferred. A low frequency or a direct voltage wave is then applied, preferably but not necessarily by way of an isolating device to the control electrode of the same last electron discharge device to reproduce the alternating potential wave modulated in amplitude by the applied low frequency or direct voltage wave between the anodes of the electron discharge devices.

The invention is described hereinafter with reference to the accompanying drawing forming part of the specification and in which:

Fig. 1 is a schematic diagram of a circuit arrangement according to the invention incorporating a low frequency or direct voltage translating circuit, which in conjunction with other circuit provides A. G. C. for an amplifier carrying the types of signals previously described.

Fig. 2 is a graphical representation of the waveforms developed in the circuit arrangement of Fig. 1; and Fig. 3 is another graphical representation of waveforms that may be found in the circuit when used as an amplitude comparator.

Referring to Fig. 1 there is shown in schematic form cascade-connected vacuum tubes 12 and 13 and an output cathode follower 14, which comprise an example of a conventional pulse repeater or amplifier for amplifying a pulse signal wave of the type previously described. The signal wave to be amplified is applied to an input terminal 11 and the amplified output signal wave is obtained from output terminal 15. The desired operation is obtained without automatic control of gain by connecting both sets of terminals 17—18 and 19—20 in the grid circuits of the amplifier tubes 12 and 13 together respectively. By applying the proper automatic gain control voltages to either or both of these sets of terminals the gain can be varied inversely of the input or output signal amplitude in known manner. The known type of automatic gain control circuit wherein a diode, a capacitor and a load resistor are connected across the output terminals 21 and 22 to produce an automatic gain control voltage for application to either set of terminals 17—18 or 19—20, is ordinarily of no practical value in pulse handling circuits because the rectified D. C. voltage is not sufficiently constant with respect to the repetition rate of the peak pulses applied to input terminals 11.

The proper automatic gain control bias voltage for such an amplifier circuit is provided according to the invention by the combination of circuit elements connected between the terminals 21—22 and 17—18. Essentially this circuit arrangement comprises an automatic slide-back peak-to-peak reading voltmeter having the input connected to the amplifier load terminals 21—22 and providing a direct output voltage at the terminals 25 and 26 proportional to the peak voltage amplitude of the recurrent video pulse supplied to the output terminal 15 of the amplifier 10. A modulator element or repeater or a D. C. amplifier circuit arrangement is connected to the terminals 25 and 26 to produce an amplified pulsating output at the terminals 29 and 30, which output voltage is filtered by the filter connected between the terminals 17, 18 and 29, 30.

Only the essentials of the automatic slide back vacuum tube voltmeter are shown in Fig. 1. A complete description of this type of voltmeter including other desirable features will be had on referring to the Proceedings of the IRE for February 1947, in which there appears an article entitled "An Automatic Slide Back Peak Voltmeter for Measuring Pulses," by C. J. Creveling and L. Mautner. The output of the voltmeter at the terminals 25, 26 approaches the peak value of the highest amplitude pulse at the output terminals 21—22 of the amplifier 10. Where the repetition rate and other characteristics of the applied pulse train are sufficiently constant, the portion of the peak-reading voltmeter between the circuit points P1 and P2 may be omitted. An isolating resistor should be used to apply direct bias potential to the grid of the tube 35.

The D. C. amplifier or repeater according to the invention comprises a first cathode follower triode 35 to the grid circuit of which the D. C. or low frequency potential appearing across terminals 25 and 26 is applied. This triode is used mainly for isolating and impedance matching purposes, though other advantages may accrue as well. In the circuit shown, the one megohm back-resistance of the diode 36 serves as the grid return but a resistor may be used if desired. The output of the triode 35 obtained across the cathode resistor 39 is mixed with a constant frequency recurring wave applied to the reference wave terminals 41—42 and applied to the grid 47 of a triode vacuum tube 51. The triode 51 is interconnected with a second triode 53. The cathodes 57 and 59 are intercoupled and connected to a source of negative voltage by means of a common cathode resistor 61. The anodes 65 and 67 of the tubes 51 and 53 respectively are connected to a common source of positive potential through anode resistors 71 and 73 respectively and interconnected by means of a diode element 79. The diode element 79 may be connected in opposite direction if diodes 101 and 103 are reversed and a symmetrical waveform at terminals 41—42 is used as in Fig. 2. The grid 83 of the triode 53 is connected to a source of positive potential by means of a voltage divider arrangement comprising resistors 87 and 89. Preferably, the resistor 87 is variable in order to adjust the ratio of the resistances and thereby vary the grid voltage applied to the reference grid 83. The anodes 65 and 67 are connected to the output terminals 29 and 30 respectively by direct current isolating capacitors 91 and 93. A diode element 101 is shunted across terminals 29 and 30 and another diode element 103 is connected in series with a resistor 105 between terminals 17 and 29. A resistor 111 is connected between terminals 18 and 30. Capacitors 115 and 117 interconnect the ends of resistors 105 and 111 to complete the filter arrangement. A phase inverted amplified direct current of low frequency voltage proportional to the average amplitude of the low frequency or direct voltage applied to the terminals 25—26 is produced at the bias terminals 17—18. If desired, the terminals 17 and 18 may be connected together and the output of the filter connected to terminals 19 and 20, the shorting link being removed, of course. Alternatively, another filter unit might be connected through blocking capacitors between anodes 67 and 65 and 19—20, care being taken to prevent coupling between the grid circuits of the amplifier tubes 12 and 13. It is understood, of course, that any controlled electron flow path device, such as a transistor or a controllable semi-conductor device, having emitter, control and collector elements, may be substituted for the evacuated electron discharge devices shown by following the accepted design principles known to those skilled in the art.

The low frequency repeater circuit described is subject to the usual rule of modulation that the frequency of the wave applied at the terminals 41—42 must be at least twice the modulating frequency applied to the terminals 25—26. A ratio of 5:1, of course, will afford better results and if a ratio of 10:1 or greater can be used, the filter design, when used as in Fig. 1, will be much easier. A simple explanation of the repeater for the two tubes 51 and 53 operating in a perfectly symmetrical circuit is as follows. Neglecting the effect of rectifier 79, the potentiometer 87 is set to apply a predetermined value of potential $e_c$ on the grid 83 of the tube 53. If a potential $e_1$ equal to the potential $e_c$ applied to the grid 83 is applied to the grid 47 of the tube 51, the anode potential of the tubes will be equal and there will be zero voltage between plate 67 and plate 65 as shown by axis 201, Fig. 2. If the potential $e_1$ is greater than the potential $e_c$ the anode 65 of the tube 47 will be more negative than the anode 67 of the tube 53. Likewise, if the potential $e_1$ is less than the potential $e_c$, the anode 65 will be more positive than the anode 67. Still neglecting the effect of the rectifier 79, a square wave voltage applied to the terminals 41 and 42 will result in the waveform represented by the curve 203 at *a* of Fig. 2. Again neglecting the effect of the rectifier 79, a low frequency voltage waveform represented by the envelope curve 205, superimposed on the grid 47 of the tube 51 will produce a waveform as represented by the curve 207 at *b*. Taking into account the effect of the rectifier 79, the waveform represented by the curve 210 is obtained between the anodes 65 and 67. The dashed lines above the curve 210 indicate the pulse portions eliminated by the action of the rectifier element 79. The normal bias voltage at amplifier 12 grid with no signal at input 11 is zero. If the input at 11 is zero, then the output at terminals 21 and 22 is approximately zero. As previously explained, the action of the slide back voltmeter should now produce a voltage at terminals 25 and 26 of approximately zero, which means that with no signal at input 11 of amplifier 10 the average D. C. voltage at the grid 47 of tube 51 is in the vicinity of zero. It is assumed, for simplicity, that when the signal to input 11 of amplifier 10 is zero, that the average D. C. voltage at the grid 47 of the tube 51 is zero. It was previously explained that when the average D. C. voltage $e_1$ at grid 47 of tube 51 is equal to the D. C. voltage $e_c$ at grid 83 of tube 67 all the square wave extending above axis 201 would be removed by the action of rectifier 79. It is obvious that if $e_c$ is increased more positive by varying resistor 87, that curve 210 could extend well above axis 201. When this condition exists, rectifier 79 locks anodes 67 and 65 at axis 201 and there is no square wave output at terminals 29 and 30. This is the normal operating condition for the circuit of Fig. 1 with no signal at input 11. If a small signal such as a radar signal of the type previously described is fed into amplifier 10 at input 11, the signal will appear at terminals 21 and 22. The slide back voltmeter circuit between $p_1$ and $p_2$ will develop a positive voltage at terminals 25 and 26 corresponding to the recurring peak values of the signal at terminals 21 and 22 as previously explained. This positive voltage at terminals 25 and 26 increases positively the voltage $e_1$ at grid 47 of tube 51, which causes the curve 210 to again approach the axis 201. Increasing the signal at input 11 of amplifier 10 any further after signal has caused curve 210 to approach axis 201, causes the square wave to appear below axis 201 as by curve 209. This square wave now appearing at anodes 67 and 65 is rectified and filtered into a negative D. C. voltage at terminals 17 and 18, which reduces the gain of tube 12: thus an A. G. C. action tending to keep the peak values of signal constant at output 15 of amplifier 10 after they have reached a predetermined value as set by the voltage $e_c$ at the grid 83 of tube 53 as by resistor 87. The circuit between terminal 25—26 and 17—18 in this case is acting as a delayed D. C. amplifier which in conjunction with slide back voltmeter constitutes a delayed A. G. C. circuit. In other words the signal at 21 and 22 must reach a predetermined peak value before any bias at 17 and 18 is produced to reduce the gain of amplifier 10. When the signal input to input 11 is above the predetermined value, as previously explained, any increase or decrease of recurring peaks of signal at input 11 of amplifier 10, which as explained above, cause the square wave to extend below axis 201 as by curve 209 will cause the voltage at terminals 17 and 18 to vary as the average of the curve 209 and is represented by the curve 211. The output at the bias terminals 17—18 is a direct voltage proportional to the average filtered input at the terminals 29—30 which delivers substantially constant bias to the tube 12 varying only as the output voltage at the terminals 21—22 varies, which is the result of signal at input 11. The maximum direct voltage obtainable across the bias terminals 17—18 for given operating potentials is the average value of the wave applied at the terminals 41—42 multiplied by the gain of the circuit comprising the triodes 51—53.

The low frequency or direct voltage translating circuit arrangement between the input terminals 25—26 and 41—42 and the output terminals 29—30 is not limited to the application hereinbefore described but has additional advantageous applications as well. The circuit arrangement offers a decided advantage as a remote gain control for a straight-sided pulse amplifier with grids at different D. C. levels. The input pulse wave is applied to the terminals 41—42 and the amplified pulse wave is obtained between ground and either one of the anodes 65—67. A direct voltage is applied to the grid 47 either directly or preferably by a cathode follower 35 to determine the desired operating conditions. The gain of an amplifier can be adjusted remotely by changing the direct voltage applied at terminals 25—26. This voltage can easily be applied at the end of a long direct current line without incurring serious ohmic losses and without any stray coupling to the alternating current wave being translated by the circuit.

The circuit arrangement can be used as a remote trigger phasing circuit. A sawtooth wave as represented by both of the curves 221 and 225 of Fig. 3 is applied to the input terminals 41—42. A wave, represented by the curve 221 alone, is taken off the terminals 29—30. A variable weight square wave can be produced by putting output 29—30 into an overdriven amplifier. That is, the per cent time one tube conducts out of the total period for one cycle, is adjusted as shown by the curve 227 by the value of direct potential applied to the terminals 25—26. The trigger time is thus changed by a change in direct potential level, which arrangement affords considerable accuracy to be obtained with relatively simple circuitry. By coupling a conventional differentiating circuit to the output of the overdriven amplifier, a pulse may be obtained at any time during the sawtooth period as represented by the curve 229 of Fig. 3.

The circuit arrangement shown in Fig. 1 between terminals 25—26 and 18—17 was constructed and operated with the component parts values given below for use with a 30 kc./s. square wave applied to terminals 41—42 and 0–500 c./s. input wave to terminals 21—22 with 280 volts between ground and the terminal marked +B, 160 V volts between ground and the terminals marked + and −150 volts between ground and the terminals marked −.

| Ref. Nr. | Component | Unit | Unit or Type |
|---|---|---|---|
| 23 | Diode |  | 1N70. |
| 24 | Capacitor | 0.01 | Mfd. |
| 27 | do | 0.01 | Mfd. |
| 35 | Tube | ½12AT7 |  |
| 36 | Diode | 100 | Kilohms. |
| 37 | Resistor | 1N70 |  |
| 39 | do | 47 | Do. |
| 40 | do | 10 | Do. |
| 43 | Potentiometer | 100<br>270 | Ohm shunted by ohms fixed. |
| 45 | Capacitor | 0.01 | Mfd. |
| 51 | Tube | ½12AT7 |  |
| 53 | do | ½12AT7 |  |
| 61 | Resistor | 12 | Kilohms. |
| 71 | do | 10 | Do. |
| 73 | do | 12 | Do. |
| 79 | Diode | 1N70 |  |
| 87 | Variable Resistor | 1 | Kilohms. |
| 88 | Capacitor | 0.1 | Mfd. |
| 89 | Resistor | 270 | Kilohms. |
| 91 | Capacitor Tube 51 | 0.01 | Mfd. |
| 93 | Capacitor Tube 53 | 0.01 | Mfd. |
| 101 | Diode | 1N70 |  |
| 103 | do | 1N70 |  |
| 105 | Resistor | 22 | Kilohms. |
| 111 | do | 22 | Do. |
| 115 | Capacitor | .010 | Mfd. |
| 117 | do | 0.01 | Mfd. |

The whole circuit arrangement of Fig. 1 was designed for a variable pulse rate of 60 c./s.–15.75 kc./s. with pulses varying in width from 0.6 to 10 μs. being translated through amplifier 10. A square wave of 15 kc./s. was then applied to ther terminals 41—42.

The invention claimed is:

1. In a pulse train translating circuit including a pulse train repeater having input and output circuits, means incorporating automatic control of gain, comprising a potential metering circuit coupled to said output circuit to develop a direct potential proportional to the potential of the pulses of said train at said output circuit, a direct current and low frequency amplifier circuit having output terminals producing an alternating potential in response to an alternating voltage wave applied at one set of input terminals and arranged to modulate said wave in amplitude proportional to said direct potential obtained from said metering circuit, and a rectifier circuit coupled to the output terminals of said direct current and low frequency amplifier circuit to produce a direct voltage proportional to the potential of the pulses of said train at said output terminals, and means to apply said direct voltage to the input circuit of said repeater in opposition to the amplitude variations of said pulse train.

2. A circuit arrangement as defined in claim 1 and wherein the potential metering circuit develops a potential proportional to the peak amplitude of the pulses of said train at the output circuit of said pulse train repeater.

3. A circuit arrangement as defined in claim 1 and wherein said input circuit of said pulse repeater comprises an electron flow path device having at least electron emitter and electron control elements to which said pulse train is applied and to which said direct voltage is applied to bias one of said elements with respect to the other.

4. A low frequency or direct voltage translating circuit arrangement comprising a pair of electron flow path devices having electron emitter, electron control and electron collector elements, an impedance element connected in common to said electron emitter elements, output impedance elements individual to said electron collector elements, a rectifier element connected between said electron collector elements, means to apply a predetermined potential on the electron control element of one of said electron flow path devices, means to apply an alternating potential wave of substantially constant frequency to the electron control element of the other of said electron flow path devices, and means to apply a low frequency or direct voltage wave to the electron control element of said other of the electron flow path devices thereby to reproduce said alternating potential wave modulated by said low frequency or direct voltage wave at said electron collector elements.

5. A low frequency or direct voltage translating circuit arrangement comprising a pair of electron flow path devices having electron emitter, electron control and electron collector elements, an impedance element connected in common to said electron emitter elements, output impedance elements individual to said electron collector elements, a rectifier element connected between said electron collector elements, output coupling devices capable of passing alternating current individual to said electron collector elements, means to apply a predetermined potential on the electron control element of one of said electron flow path devices, means to apply an alternating potential wave of substantially constant frequency to the electron control element of the other of said electron flow path devices, and means to apply a low frequency or direct voltage wave to the electron control element of said other of the electron flow path devices thereby to reproduce said alternating potential wave modulated by said low frequency or direct voltage wave at said output coupling devices.

6. A low frequency or direct voltage translating circuit arrangement comprising a pair of electron discharge structures having cathode, control and anode electrodes, an impedance element connected in common to said cathode electrodes, output impedance elements individual to said anode electrodes, a rectifier element connected between said anode electrodes, means to apply a predetermined potential on the control electrode of one of said electron discharge structures, means to apply an alternating potential wave of substantially constant frequency to the control electrode of the other of said electron discharge structures, and means to apply a low frequency or direct voltage wave to the control electrodes of said other electron discharge structure device thereby to reproduce said alternating potential wave modulated by said low frequency or direct voltage at anode electrodes.

7. A low frequency or direct voltage translating circuit arrangement comprising a pair of electron discharge structures having cathode, control and anode electrodes, an impedance element connected in common to said cathode electrodes, output impedance elements individual to said anode electrodes, a rectifier element connected between said anode electrodes, means to apply a predetermined potential on the control electrode of one of said electron discharge structures, means to apply an alternating potential wave of substantially constant frequency to the control electrode of the other of said electron discharge structures, and means to apply a low frequency or direct voltage wave to the control electrode of said other electron discharge structure thereby to reproduce said alternating potential wave modulated by said low frequency or direct voltage wave at said anode electrodes.

8. A low frequency or direct voltage translating circuit arrangement comprising a pair of electron flow path devices having electron emitter, electron control and electron collector electrodes, an impedance element connected in common to said electron emitter electrodes, output impedance elements individual to said electron collector electrodes, a rectifier element connected between said electron collector electrodes, output coupling devices capable of passing alternating current individual to said electron collector electrodes, means to apply a predetermined potential on the electron control electrode of one of said electron flow path devices, means to apply an alternating potential wave of substantially constant frequency to the electron control electrodes of the other of said electron flow path devices, and means to apply a low frequency or direct voltage wave to the electron control electrode of said other of the electron flow path devices, a diode element coupled to both of said output coupling devices, filter impedance element and another diode element connected in series to one of said output coupling devices, another filter impedance element connected to the other output coupling device, and reactive impedance elements bridged across said filter impedance elements.

9. A low frequency or direct voltage translating circuit arrangement comprising a pair of electron discharge structures having cathode, control and anode electrodes, an impedance element connected in common to said cathode electrodes, output impedance elements individual to said anode electrodes, a rectifier element connected between said anode electrodes, means to apply a predetermined potential on the control electrode of one of said electron discharge structures, means to apply an alternating potential wave of substantially constant frequency to the control electrode of the other of said electron discharge structures, means to apply a low frequency or direct voltage wave to the control electrode of said other electron discharge structure device thereby to reproduce said alternating potential wave modulated by said low frequency or direct voltage wave at anode electrodes, and direct current isolating impedance element coupled to said anode electrodes.

10. A low frequency or direct voltage translating circuit arrangement comprising a pair of electron discharge structures having cathode, control and anode electrodes, resistive element connected in common to said cathode electrodes, output resistance elements individual to said anode electrodes, a rectifier element connected between said anode electrodes, an adjustable voltage divider arrangement to apply a predetermined potential on the control electrode of one of said electron discharge structures, a potentiometer arranged to apply an alternating potential wave of substantially constant frequency to the control electrode of the other of said electron discharge structures, and a cathode follower circuit arranged to apply a low frequency or direct voltage wave to the control electrode of said other electron discharge structure device thereby to reproduce said alternating potential wave modulated by said low frequency, or direct voltage wave at anode electrodes.

HOWARD MULDER SCOTT.

References Cited in the file of this patent

UNITED STATES PATENTS

| Number | Name | Date |
|---|---|---|
| 2,519,359 | Dean | Aug. 22, 1950 |
| 2,585,883 | Wendt et al. | Feb. 12, 1952 |
| 2,624,797 | Lawson et al. | Jan. 6, 1953 |